(No Model.) 2 Sheets—Sheet 1.
E. THOMSON.
REGULATOR FOR DYNAMO ELECTRIC MACHINES AND MOTORS.
No. 367,470. Patented Aug. 2, 1887.
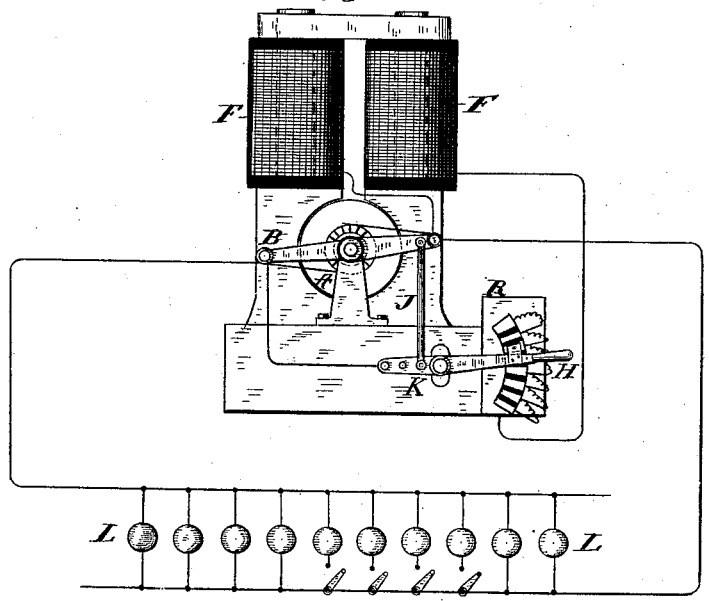
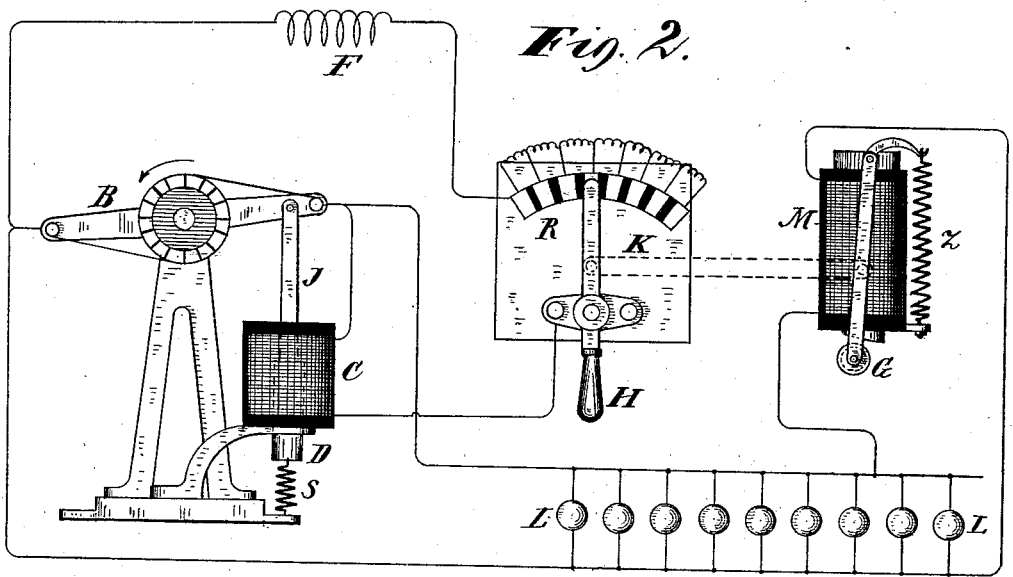
WITNESSES: INVENTOR
Elihu Thomson
BY
ATTORNEY (No Model.) 2 Sheets—Sheet 2.
E. THOMSON.
REGULATOR FOR DYNAMO ELECTRIC MACHINES AND MOTORS.
No. 367,470. Patented Aug. 2, 1887.
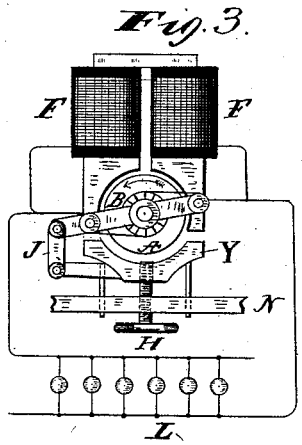
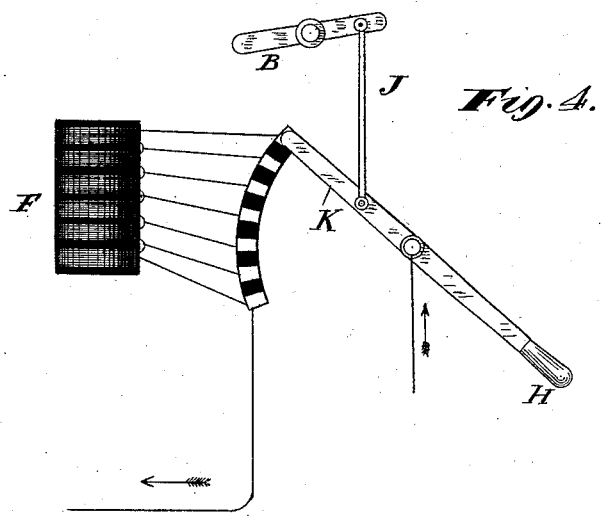
WITNESSES:
INVENTOR
Elihu Thomson
BY
ATTORNEY

UNITED STATES PATENT OFFICE.

ELIHU THOMSON, OF LYNN, MASSACHUSETTS.

REGULATOR FOR DYNAMO-ELECTRIC MACHINES AND MOTORS.

SPECIFICATION forming part of Letters Patent No. 367,470, dated August 2, 1887.

Application filed April 14, 1886. Serial No. 198,859. (No model.)

*To all whom it may concern:*

Be it known that I, ELIHU THOMSON, a citizen of the United States, and a resident of Lynn, in the county of Essex and State of Massachusetts, have invented certain new and useful Regulators for Dynamo-Electric Machines and Motors, of which the following is a specification.

My invention relates to means for regulating or determining the action of dynamo-electric machines and motors through variation of the field magnetism accompanied by simultaneous adjustment of the commutator of the machine.
The invention is primarily designed for application to machines used as generators of electricity, but may also be applied to electric motors.

The object of my invention is to provide a regulator for application to dynamo-machines in which the field is maintained by current in a derived circuit to the work; and the invention consists in the novel combinations of devices and details of construction that will be described in connection with the accompanying drawings, and will be more specifically designated in the claims.

The aim of the invention is more especially to provide a regulator in which the commutator-brushes shall be automatically adjusted to exact correspondence with the changed neutral line produced through change in the magnetic field, so as to secure entire absence of sparking at the commutator under all conditions of adjustment.

In the drawings, Figure 1 is an elevation of a dynamo combined with regulating apparatus constructed in accordance with my invention and connected to a working-circuit. Fig. 2 is a diagram illustrating a modified arrangement of devices for effecting the simultaneous field-varying and commutator-adjusting actions. Figs. 3 and 4 show modified arrangements for varying the magnetic field.
Referring to Fig. 1, F F indicate the field-magnet coils of a dynamo machine or motor of any form, and A the revolving armature thereof.

B is a movable lever carrying the commutator-brushes and adapted to be moved in either direction, so as to determine the relation of the brushes to the magnetic field and the neutral line.

The field-coils of the machine are connected in derived circuit to the working-circuit that supplies electric lamps L L, or other devices in multiple arc, as indicated, and in said derived circuit is placed a variable resistance, R, of any desired kind, whose amount is determined by means of a lever, K, having an operating-handle, H, which moves a spring over a series of contacts connected to the sections of the resistance.

The operation of such a device, being well understood in the art, need not be more particularly described. In its place, however, any means may be used for varying the strength of the magnetic field—such, for instance, as a sectional field-coil whose sections may be cut out or introduced into circuit by means of a handle operating a sliding contact, as illustrated in Fig. 4. Such a device is also well known in the art as a means of changing the strength of the magnetic field.

Connected with the movable handle operating the sliding contact that changes the resistance or the number of coils, so as to adjust the field, is a link, J, that serves to impart movement to the commutator-brush holder simultaneously with the movement of the sliding contact.

The mechanical connections are such, as will be obvious on inspection, that simultaneously with the insertion of resistance into the field-circuit, so as to cut down the strength of the field, there is produced a backward movement of the brushes, while on the cutting out of resistance and the consequent strengthening of the field the brushes are automatically moved forward. As will be obvious, therefore, when the number of multiple-arc circuits containing lights or other devices, L, is increased, the potential is restored to normal by increasing the strength of the field, while simultaneously the brushes are moved automatically forward, so as to follow the neutral point, and vice versa.

In the arrangements just described a mechanical connection, J, between the brush or movable commutator and the field-varying devices is employed for effecting simultaneous adjustment through the action of an operating-handle, H, during changes of load. It will be obvious, however, that any other connection—mechanical, hydraulic, pneumatic, or electric in its action and properly controlled to unite the two elements of field-varying devices and adjustable commutator—may be employed when the adjustments are effected by the action of an operating-handle.

In Fig. 2 I have shown how an electro-magnet may be utilized for producing the desired simultaneous actions. In this case movement is communicated to the brush-holder of the commutator by means of an electro-magnet, C, whose coils are included in the circuit with the variable resistance R, and whose core D is lifted into the coil on an increase of current in said coil, so as to move the brushes forward. A spring, S, acting in opposition to such movement of the core with an increasing power as the core is lifted, secures a gradual upward movement of the core with gradual increase of current in the coils.

Any movement of the handle H governing the resistance to keep the potential constant despite changes in the number of lights or other working devices, L, will be followed by corresponding proper adjustments of the commutator of the nature already described through the simultaneous changes of current in the coils C, consequent on the cutting out or throwing in of resistance in the field-circuit by the variable rheostat formed by the artificial resistances, its contacts, and the movable lever K, carrying the spring moving over said contacts.

It is of course to be understood that the power of the magnet C, the weight of the core D, and the force of the spring S are adjusted duly and the set of the parts of the commutator determined, so that the brushes will be kept on the neutral line during movements of the core D, effected as already described.

The action produced on the commutator by the movement of the connecting-link J may be varied by changing its leverage, such change being permitted through the device allowing adjustment of the end of link J, that is connected to the lever K, to various distances from the fulcrum of the latter. A similar variable connection to the lever B may be provided.

I have herein described the commutator as one in which the desired adjustment with relation to the neutral line is effected by moving the commutator-brushes; but I do not wish to be understood as confining myself to the adjustment of any particular portion of the commutating devices, since the relation of the brushes to the line of commutation may be changed in other ways known in the art.

It is evident that a movement of the adjusting mechanism and its adjuncts shown in Fig. 2 might be effected by means of an electro-magnet connected to the working-circuit. Such a magnet is indicated at M and is included in a derived circuit to the lights or working-resistances. Its armature G is mounted on a lever in such way that it moves transversely to the pole of the magnet.

The lever carrying the armature is connected by a link with the lever K. In this case it is plain that the coils C will operate in the same way to secure the simultaneous adjustment of the commutator.

In Fig. 3 I have shown my invention carried out by the employment of other means for determining the strength of the field-magnet, such means being in the latter instance an iron yoke, Y, supported and guided by suitable mechanism and adjusted toward or away from the field-magnet poles by means of a hand-wheel, H, connected with a screw that works in a suitable fixed frame, N. Turning the handle H, so as to cause the yoke Y to approach the field-poles, cuts down the field by shunting the magnetism of the poles in obvious ways, while the counter movement increases the field by removing the armature or yoke Y.

The field-magnet coils are, as before, in a shunt to the working-resistances L, which latter are operated in multiple arc, as shown, and require a constant potential. The link J, joining the lever or yoke B with the armature Y, is connected in such way that when the armature or yoke is brought near to the field-poles to cut down the field magnetism, which operation is rendered necessary by the decrease of load consequent on opening a branch or branches containing devices L, the brushes carried by B will be set backward, or in a direction opposite to the direction of revolution of the armature. When, however, the load is increased by an increase in the number of multiple-arc branches or working-resistances, and the armature Y is moved back so as to increase the field magnetism, the commutator will be set so that the brushes will be put forward in the direction of revolution, or in position to coincide with the new neutral line.

What I claim as my invention is—

1. The combination, with a dynamo-electric machine having its field-coils in derived circuit to the work, of a field-varying device and means for simultaneously and automatically moving the commutator-brushes backward when the field magnetism is diminished, and vice versa.

2. In a regulator for dynamo-electric machines or motors, the combination, with an adjustable commutator, of an operating electro-magnet coil, C, included in a circuit with a variable resistance and the field-magnet coil, as and for the purpose described.

3. The combination, with a dynamo-electric machine supplying working-resistances in multiple arc, of a field-coil in a derived circuit thereto, a variable resistance in said circuit, and an adjustable commutator having an operating-magnet included in the variable-resistance circuit.

4. In a dynamo-electric machine, the combination of an adjustable commutator and a magnet for operating the same, said magnet having its coils connected with a variable field-circuit, so that variations in the latter for changing the field strength will change the strength of the magnet and effect a simultaneous adjustment of the commutator.

Signed at Lynn, in the county of Essex and State of Massachusetts, this 9th day of April, A. D. 1886.

ELIHU THOMSON.

Witnesses:
M. L. THOMSON,
GEORGE J. CARR.